United States Patent [19]

Neefe

[11] 4,306,042

[45] Dec. 15, 1981

[54] METHOD OF MAKING A CONTACT LENS MATERIAL WITH INCREASED OXYGEN PERMEABILITY

[76] Inventor: Russell A. Neefe, P.O. Box 429, Big Spring, Tex. 79720

[21] Appl. No.: 185,000

[22] Filed: Sep. 8, 1980

[51] Int. Cl.³ .................. C08F 2/00; C08F 30/08; C08F 230/08
[52] U.S. Cl. .................... 526/75; 204/159.13; 264/1.1; 526/279; 556/433
[58] Field of Search ............ 526/279, 75; 264/1; 556/433; 204/159.13

[56] References Cited

U.S. PATENT DOCUMENTS

| | | | |
|---|---|---|---|
| 3,808,178 | 4/1974 | Gaylord | 526/279 |
| 4,152,508 | 5/1979 | Ellis et al. | 526/279 |
| 4,153,641 | 5/1979 | Deichert et al. | 526/279 |
| 4,189,546 | 2/1980 | Deichert et al. | 528/26 |

Primary Examiner—Herbert J. Lilling

[57] ABSTRACT

An oxygen permeable contact lens fabricated from a copolymer of a (a) siloxanyl alkylester, an ester derivative of acrylic or methacrylic acid, surface wetting agent and an oxygen permeable crosslinking agent. The copolymer can be made either hard, soft or elasticmeric with improved oxygen permeability.

4 Claims, No Drawings

METHOD OF MAKING A CONTACT LENS MATERIAL WITH INCREASED OXYGEN PERMEABILITY

BACKGROUND OF THE INVENTION

The human cornea is an independent organism that obtains its life sustaining oxygen from the tears of the eye. The oxygen consumption rate of the human cornea is approximated to be 2.8 ml/cm$^2$-hr. This value has been determined by Jauregui and Fatt, "Estimation of the Vivo Oxygen Consumption of the Human Corneal Epthelium", in the American Journal of Optometry and Archives of American Academy of Optometry, June 1972, page 507.

Contact lenses have been made from various materials since the early 1950's. Table I illustrates some of the materials, the common term, its composition and its disadvantages.

TABLE I

| COMMON TERM | COMMON COMPOSITION | DISADVANTAGE |
|---|---|---|
| Hard | 95% + Poly-methylmethacrylate | Very low gas permeability |
| Semi-Rigid | 90% + Cellulose Acetate Butyrate | Poor stability |
| Soft | 60% + Polyhydroxy-Methacrylate | Poor durability |
| PMMA/Silicone | 40%–60% Polymethylmethacrylate & 40%–60% Siloxanyl alkyl ester | Marginal oxygen permeability & stability |
| Silicone | 10%–90% Phenyl-siloxanes and 10%–90% Methylvinylsiloxanes | Poor surface wettability & poor durability |

Attempts have been made in correcting these disadvantages. Some of these attempts have been some what successful, but not entirely. In U.S. Pat. No. 4,152,508, they deal with stability, but the increasing of oxygen permeability was never really attained, due to the use of non-oxygen permeable crosslinking agents. The use of dimethacrylates (the preferred embodiments) did improve the stability over that of U.S. Pat. No. 3,808,178, but did decrease oxygen permeability to some degree. Thus, a material with excellent oxygen and carbon dioxide permeability is preferably for metabolic action of the cornea. The surface of the material must be wettable and compatible with fluids of the eye.

SUMMARY OF THE INVENTION

The primary object of this invention is to provide a novel contact lens material which is prepared from a combination of monomers so as to have high oxygen, carbon dioxide permeability and a hydrophilic surface. It would be preferable to have sufficient mechanical strength to permit precision machining and polishing. Although, lenses could be fabricated by casting or molding if an elastomeric material is preferable.

According to the invention a contact lens material is prepared by copolymerizing:
(a) from 5 to 90% by weight of a siloxanyl alkyl ester monomer with;
(b) from 3 to 90% by weight of an ester of acrylic or methacrylic acid;
(c) from 0.5 to 90% by weight of a surface wetting agent;
(d) from 0.01 to 90% by weight of an oxygen permeable crosslinking agent.

Representatives of (a) a siloxanyl alkyl ester monomers included but not restricted to the following:
Methacryloxypropylheptamethylcyclotetrasiloxane
Methyldi(trimethylsiloxy)-methacryloxymethylsilane
n-pentylhexamethyltrisiloxanylmethyl methacrylate
Pentamethyldisilanyldi(trimethylsiloxy)acryloxymethylsilane
tris(pentamethyldisiloxy)methacryloxyproplsilane
tri-i-propyltetramethyltrisiloxanylethyl acrylate
1,1,1 tris(trimethylsiloxy)methacryloxypropylsilane Representatives of (b) an ester derivatives of acrylic or methacrylic acid monomer include but not restricted:

| | |
|---|---|
| Butyl | acrylate and methacrylate |
| Ethyl | acrylate and methacrylate |
| 2-ethyl | acrylate and methacrylate |
| Glycidyl | acrylate and methacrylate |
| Hexyl | acrylate and methacrylate |
| Lauryl | acrylate and methacrylate |
| Methyl | acrylate and methacrylate |
| Stearyl | acrylate and methacrylate |

Representatives of (c) a surface wetting agent include but not restricted:
Acrylamide
t-Butylaminoethyl methacrylate
Dimethylaminoethylacrylate and methacrylate
N-(1,1-Dimethyl-3-Oxobutyl)-acrylamide
Ethylene Gylcol Monoacrylate and Monomethacrylate
Glacial acrylic and methacrylic acid
Glycidyl acrylate and methacrylate
Propylene glycol monoacrylate and monomethacrylate
Methacrylamide
Morpholinoethyl acrylate and methacrylate
Piperidinoethyl acrylate and methacrylate
Triethylene glycol methacrylate
N-vinyl pyrrolidone The preferred (d) oxygen permeable crosslinking agents include but not restricted to the following:
Dimers, trimers and tetramers of (a) siloxanyl alkylesters
N-(1,1-Dimethyl-3-Oxobutyl)-acrylamide
1,3 Bis(glycidoxypropyl)tetramethyldisiloxane
Divinyl Diphenyl Silane
Tetravinylsilane
Vinyl Trialloxyl Silane
Vinyl Trichloro Silane
Propylene Glycol Monoacrylate and monomethacrylate
Ethylenglycol monoacrylate and monomethacrylate The copolymers of this invention is prepared by conventional polymerization by either free radical initiators or by photoinitiators. Representatives of free radical initiators include but not restricted:
Acetyl Peroxide
2,2,Azobis(2-methylpropinitrile)
Benzoyl peroxide
t-Butyl peroctoate
Caprylyl peroxide
Decanoyl peroxide
Diisopropyl peroxydicarbonate
2,5-dimethyl-2,5-bis(2-ethyl hexanoylperoxy)hexane
Lauroyl peroxide
Tertiarybutyl peroctoate
Tertiarybutyl peroxypivalate Representatives of photo-initiators include but not restricted:
Benzoin
Benzophenone
2,2 Azobis(2-methylpropionitrile)

THE PREFERRED EMBODIMENT

The following examples are presented to illustrate the invention but not restricted to the following:

EXAMPLE I

This example demonstrates the synthesis of a siloxanyl alkyl ester monomer representative, 1,1,1 Tris(-trimethylsiloxy)methacryloxypropyl silane (TRIS), as used in U.S. Pat. No. 3,808,178. The present process is far less expensive and gives higher oxygen permeability due to the absence of non oxygen permeable by products. 23.9 g (0.1 mole) of methacryloxypropyltrimethoxysilane is mixed with 429 g (4 mole) trimethylchlorosilane. The mixture is then added to 3 liters of water. The water is used as a catalyst and for cooling. After the mixture is added to the water, it is stirred for approximately 24 hours at room temperature. After allowing to set for 30 minutes, the upper layer is then separated, dried over calcium or sodium sulfate, and then filtered. Using a vacuum still, the hexamethyldisilane by product is stripped off. (With a sufficient vacuum, the distillation temperature can be kept down to 30°–40° C.

EXAMPLE II

This example demonstrates the synthesis of 1,1,3,3 tetrakis(trimethylsiloxy)1,3 bis(methacryloxypropyl)-disiloxane(Di), a crosslinking dimer of 1,1,1 tris(trimethylsiloxy)methacryloxypropylsilane.

23.9 g of methacryloxypropyltrimethoxysilane is added to a mixture of 50 ml water and 5 ml diluted acetic acid. The mixture is stirred for 3 hours with a magnetic stirrer. Then the procedures of Example I are followed.

EXAMPLE III

This example demonstrates the polymerization of the novel polymer by use of the siloxanyl alkyl ester prepared in Example I and the oxygen permeable crosslinking agent in Example II.

A rod is prepared by polymerizing 50 parts of TRIS, 40 parts methyl methacrylate (MMA), 3.5 parts of 1,1,3,3 tetrakis(trimethylsiloxy)1,3 bis(methacryloxypropyl)disiloxane(Di), and 6.5 parts of N-(1,1-Dimethyl-3-Oxobutyl)acrylamide (DAA) in the presence of 0.25 parts benzoyl peroxide (BPO) at 70° C. with water bath for 12 hours and a post cure at 100° C. for 24 hours. Contact lens blanks are fabricated to ½ inch round diameter and 3/16 inch thick by lathe cutting. Lens are prepared by conventional techniques and are hard, transparent, and highly oxygen permeable.

EXAMPLE IV

This example demonstrates the synthesis of 1,5 Bis(-methacryloxypropyl) 1,1,5,5 tetra kis(trimethylsiloxy) 3,3 dimethyl trisiloxane (BIS), a dimer of TRIS. 13 g sulfuric acid is added in a dropwise manner to 15 g ethanol (medical grade) and 10 g of water in a flask equipped with a magnetic stirrer. If the sulfuric acid is added at a rate of one to two drops per second, a water bath is not necessary (any faster drop rate, and a water bath should be used for cooling).

49.62 g (0.2 mole) of methacryloxypropyl trimethoxy silane, 17.63 g (0.1 mole) of dimethyldiacetoxysilane, and 43.48 g (0.4 mole) of trimethyl acetoxy silane are placed in a flask equipped with an ice bath and a magnetic stirrer. Then 13 g of ethanol/sulfuric acid is added in a dropwise manner to the mixture while stirring. Continue ice bath for five minutes after the entire amount of ethanol/sulfuric acid has been added to the mixture. The mixture should be stirred for up to three days at room temperature to assure complete reaction. The upper layer is separated from the rest and filtered. The remaining by-product (ethyl acetate) is stripped off by means of a vacuum stripper or a vacuum still at a temperature ranging from 35° to 45° C. depending upon the degree of vacuum pulled. Refrigerated storage is recommended to prevent premature reactions.

EXAMPLE V

This example demonstrates the polymerization of the novel polymer by use of the siloxayl alkyl ester prepared in Example I and the oxygen permeable crossling agent in Example IV.

A rod is prepared by polyermizing 45 parts by weight of TRIS, 45 parts by weight of MMA, 5 parts by weight of BIS and 5 parts by weight of DAA in the presence of 0.25 parts by weight of BPO. Heat at 70° C. with a water bath for 12 hours and post cure with a water bath at 85° C. for 24 hours. Contact lens blanks and lenses are prepared by conventional lathe cutting techniques. The lenses are hard, transparent, and highly oxygen permeable.

EXAMPLE VI

This example demonstrates the synthesis of 1,5,9-tris(methacryloxypropyl) 1,1,5,9,9-penta kis(trimethyl silane)tetramethylpentasiloxane (PENTA), a trimer of TRIS.

Procedures in Example IV are exactly followed except 23.51 g (0.1333 mole) of dimethyldiacetoxy silane and 44.07 g (0.333 mole) trimethylacetoxysilane are used to form a more complex molecule having three methacryl end groups for crosslinking.

EXAMPLE VII

This example demonstrates the polymerization of the novel polymer by use of the siloxanyl alkyl ester prepared in Example I and the oxygen permeable crosslinking agent prepared in Example VI.

A rod is prepared as demonstrated in Example V except PENTA as prepared in Example VI is used instead of BIS. Al procedures are followed exactly.

EXAMPLE VIII

This example demonstrates the synthesis of 1,5,9,13-tetrakis(methacryloxpropyl) 1,1,5,9,13,13-hexakis-(trimethylsiloxyl)hexamethylhepta siloxane (HEXA) a tetramer of TRIS.

Procedures in Example IV are followed exactly except 25.45 g (0.15 mole) of dimethyldiacetoxy silane and 39.66 g (0.30 mole) of trimethylacetoxy silane for a complex molecule having molecular weight of 14241.1 and four methacryl end groups for crosslinking.

EXAMPLE IX

This example demonstrates the polymerization of the novel polymer by use of the siloxanyl alkyl ester prepared in Example I and the oxygen permeable crosslinking agent prepared in Example VIII.

A rod is prepared as demonstrated by Example V except HEXA is used instead of BIS, all procedures are followed exactly.

Other poly functional derivatives of a siloxanyl alkyl ester can be prepared to have numerous reactive sites by changing the molar relationships of the intermediaries. Oxygen permeable crosslinking agents of poly(organosilane) α,ω terminally bonded through a divalent hydrocarbon group to a polymerized activated unsaturated group. Typically the poly(organosiloxanes) i.e. monomers, employed are of the following formula:

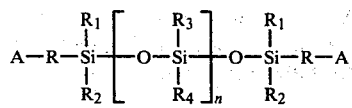

whereas A is an activated unsaturated group, $R_1$, $R_2$, $R_3$ and $R_4$ can be the same or different and each is one of a monovalent hydrocarbon radical or a halogen substituted monovalent hydrocarbon radical each containing from 0 to 15 carbon atoms, R is a divalent hydrocarbon radical containing from 1 to 20 carbon atoms, and n is an integer of zero to 1,000.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

What is claimed:

1. A method of making an oxygen permeable material for the manufacture of contact lens by the synthesization of the monomer 1,1,1-tris(methylsiloxy)methacryloxypropylsilane (a siloxanyl alkyl ester) by the following procedures:
   (a) a mixture is prepared having the relationship of one mole of methacryloxypropyltrimethoxysilane with three to forty moles of trimethylchlorosilane;
   (b) the mixture is then added to water whose volume is from 3 to 10 times that of the mixture;
   (c) agitation is maintained for 30 minutes to 48 hours;
   (d) then allow the mixture to separate into layers, remove and filter the upper organic layer;
   (e) the unwanted by-product (hexamethyldisilane) is then removed by vacuum distillation;
   (f) forming an oxygen permeable contact lens material by copolymerizing from 5% to 90% by weight of the 1,1,1-tris(trimethylsiloxy)methacryloxypropylsilane prepared above; 3% to 90% by weight of an ester of acrylic or methacrylic acid; from 0.05% to 90% by weight of a surface wetting agent, from 0.01% to 90% by weight of an oxygen permeable crosslinking agent selected from the class of multifunctional siloxanyl alkyl esters in the presence of a free radical or a photo initiator.

2. A method of making an oxygen permeable material for the manufacture of contact lens by utilizing the synthesization of 1,5 bis(methacryloxypropyl) 1,1,5,5-tetrakis(trimethylsiloxy)dimethyltrisiloxane (an oxygen permeable crosslinking agent that is a dimer of siloxanyl alkyl ester) by the following procedure:
   (a) a mixture is prepared with the relationship of: (1) 2 moles methacryloxypropyltrimethoxysilane; (2) 1 mole dimethyldiacetoxysilane; and (3) 4 moles trimethylacetoxysilane; the mixture is placed in a container that is equipped with a method of cooling and agitating;
   (b) start agitation and cooling and in a dropwise manner add 65g of ethanol/sulfuric acid solution (the catalyst solution consists of 34.2% by weight of concentrated sulfuric acid, 39.5% by weight of medical grade ethanol and 26.3% by weight of distilled water) to one mole of methacryloxypropyltrimethoxysilane;
   (c) after entirety of ethanol/sulfuric acid solution is added, continue the agitation for 24 to 72 hours;
   (d) discontinue agitation and allow the mixture to separate into two layers, remove the upper layer;
   (e) the unwanted by-products are then removed by vacuum distillation;
   (f) forming an oxygen permeable contact lens material by copolymerizing from 5% to 90% by weight of a siloxyl alkyl ester, from 3% to 90% by weight of an ester of acrylic or methacrylic acid; from 0.5% to 90% by weight of surface wetting agent, from 0.01% to 90% by weight of the 1,1,5,5-tetrakis(trimethylsiloxy) 1,3-bis(methacryloxypropyl)dimethyltrisiloxane prepared above, and in the presence of a free radical or photo initiator.

3. A method of making an oxygen permeable contact lens material utilizing the synthesization of 1,5,9 tris(methacryloxypropyl)-1,1,5,9,9-pentakis(trimethylsiloxy)-tetramethylpentasiloxane (an oxygen permeable crosslinking agent that is a trimer of a siloxanyl alkyl ester) by the following procedures:
   (a) a mixture is prepared with the relationship of: (1) 3 moles methacryloxypropyltrimethyoxysilane; (2) 2 moles dimethyldiacetoxysilane; and (3) 5 moles trimethylacetoxysilane; the mixture is placed in a container that is equipped with a method of cooling and agitating;
   (b) start agitation and cooling and in a dropwise manner add 65 g of ethanol/sulfuric acid solution (the catalyst consists of 34.2% by weight of concentrated sulfuric acid, 39.5% by weight of medical grade ethanol, and 26.3% by weight of distilled water) to one mole of methacryloxypropyltrimethoxysilane;
   (c) after entirety of ethanol/sulfuric acid solution is added, continue agitation for 24 to 72 hours;
   (d) discontinue agitation and allow the two layers to separate, remove the upper layer;
   (e) the unwanted by-products are then removed by vacuum distillation;
   (f) forming an oxygen permeable contact lens material by copolymerizing from 5% to 90% by weight of a siloxanyl alkyl ester, from 3% to 90% by weight of an ester of acrylic or methacrylic acid, from 0.5% to 90% by weight of a surface wetting agent, from 0.01% to 90% by weight of the 1,5,9-tris(methacryloxypropyl) 1,1,5,9,9-pentakis(trimethylsiloxy)tetramethylpentasiloxane prepared above, and in the presence of a free radical or photo initiator.

4. A method of making an oxygen permeable contact lens material by utilizing the synthesization of 1,5,9,13 tetrakis(methacryloxypropyl) 1,1,5,9,13,13-hexakis(- trimethylsiloxy)hexamethylheptasiloxane (an oxygen permeable crosslinking agent that is a tetramer of a siloxanyl alkyl ester) by the following procedures:

(a) a mixture is prepared with the relationship of: (1) 4 moles methacryloxypropyltrimethoxysilane; (2) 3 moles dimethyldiacetoxysilane, and (3) 6 moles trimethylacetoxysilane; this mixture is placed in a container that is equipped with a method of cooling and agitating;

(b) start agitation and cooling and in a dropwise manner add 65 g of ethanol/sulfuric acid solution (the catalyst solution consists of 34.2% by weight of concentrated sulfuric acid, 39.5% by weight of medical grade ethanol, and 26.3% by weight of distilled water) to one mole of methacryloxypropyltrimethoxysilane;

(c) after entirety of ethanol/sulfuric acid solution is added, continue agitation for 24 to 72 hours;

(d) discontinue agitation and allow the two layers to separate, remove the upper layer;

(f) forming an oxygen permeable contact lens material by copolymerizing from 5% to 90% by weight of a siloxanyl alkyl ester from 3% to 90% by weight of an ester of acrylic or methacrylic acid, from 0.5% to 90% by weight of a surface wetting agent, from 0.01% to 90% by weight of the 1,5,9,13-tetrakis(methacryloxypropyl) 1,1,5,9,13,13-hexakis(trimethylsiloxy)hexamethylheptasiloxane prepared above, and in the presence of a free radical or photo initiator.

* * * * *

UNITED STATES PATENT AND TRADEMARK OFFICE
CERTIFICATE OF CORRECTION

PATENT NO. : 4,306,042
DATED : December 15, 1981
INVENTOR(S) : Russell A. Neefe

It is certified that error appears in the above-indentified patent and that said Letters Patent is hereby corrected as shown below:

Column 3, Line 25, "hexamethyldisilane" should be-- hexamethyldisiloxane--

Column 5, Line 53, "hexamethyldisilane" should be -- hexamethyldisiloxane--

Column 5, Line 60, "0.05%" should be --0.5%--

Column 6, Line 24, "siloxyl" should be --siloxanyl--

Signed and Sealed this

Tenth Day of January, 1995

Attest:

BRUCE LEHMAN

Attesting Officer

Commissioner of Patents and Trademarks